April 28, 1970   C. VAN ANDERSON ET AL   3,509,251
METHOD OF FORMING A TANK SECTION
Original Filed Feb. 16, 1967   4 Sheets-Sheet 1

CECIL VAN ANDERSON &
WARD B MILLER
          INVENTORS

BY
          ATTORNEYS

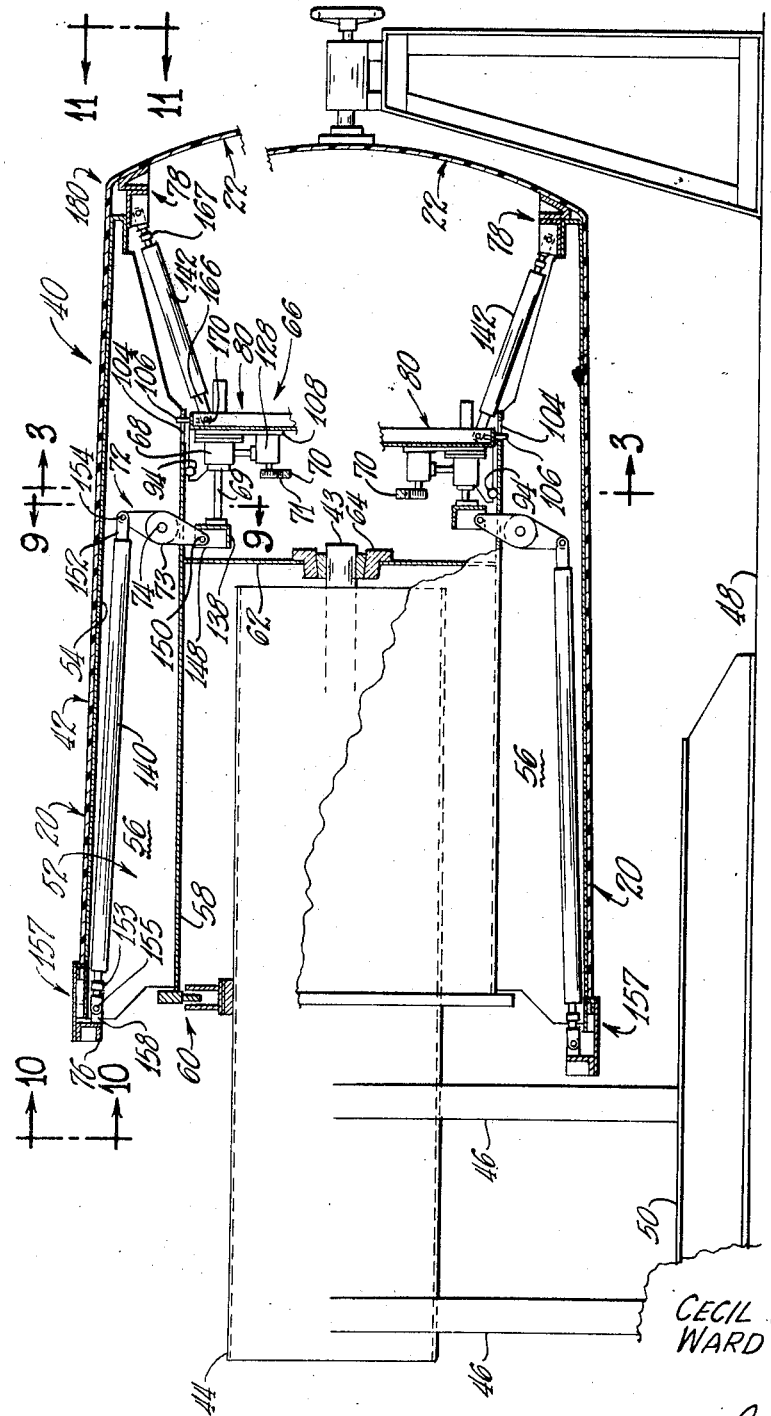

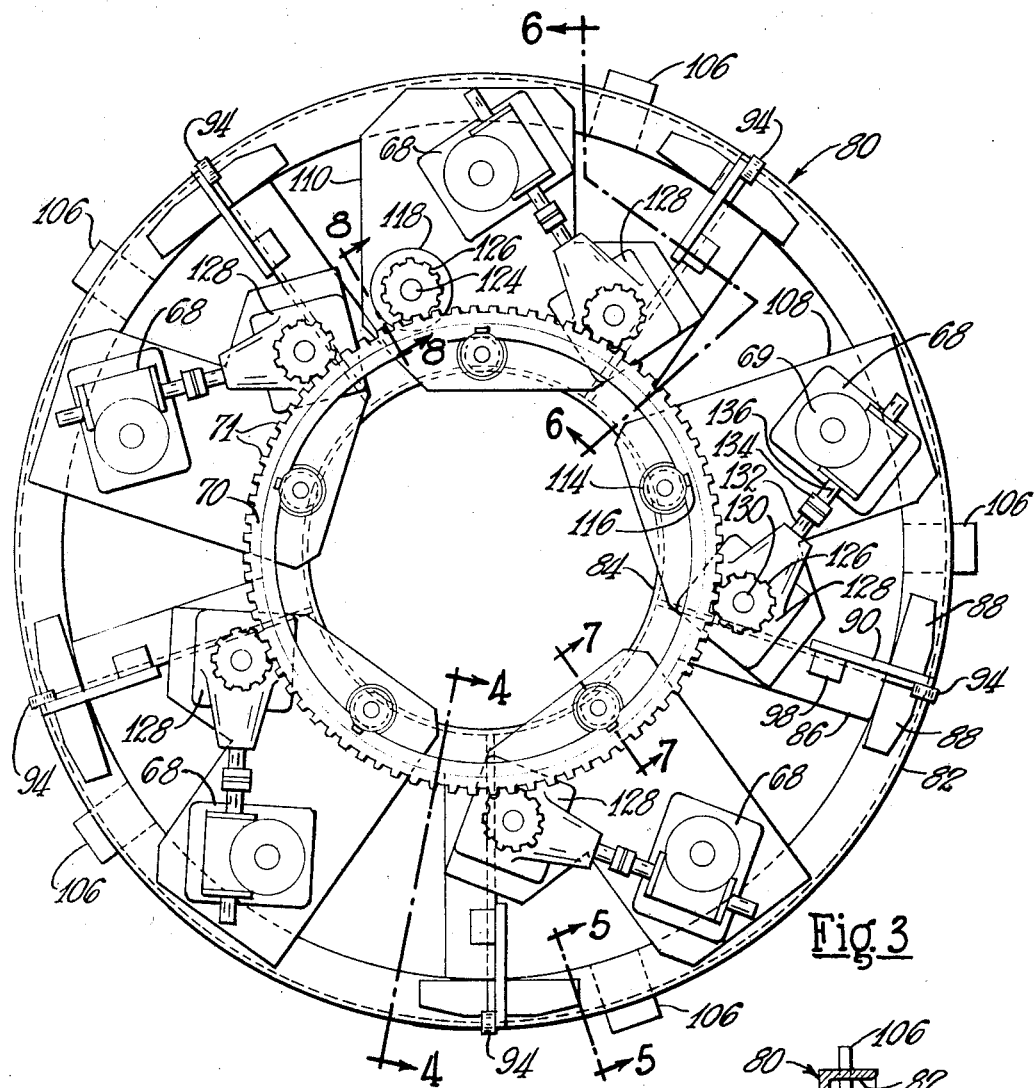
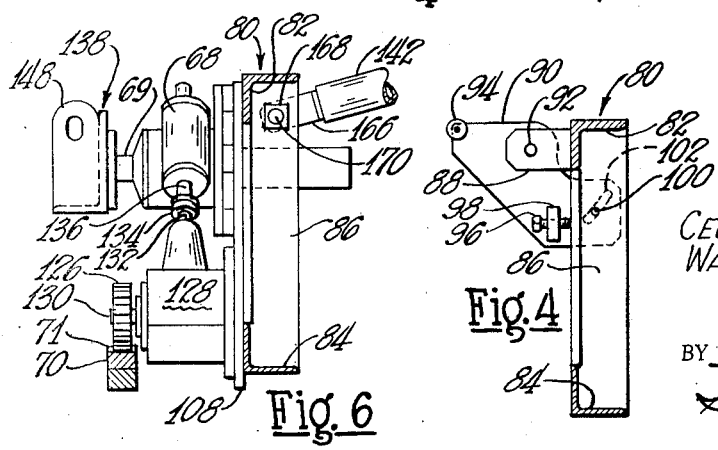

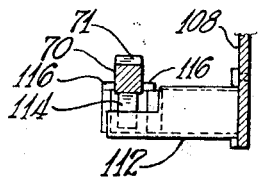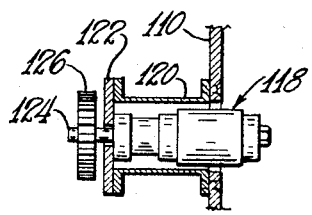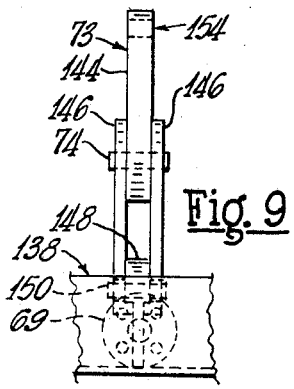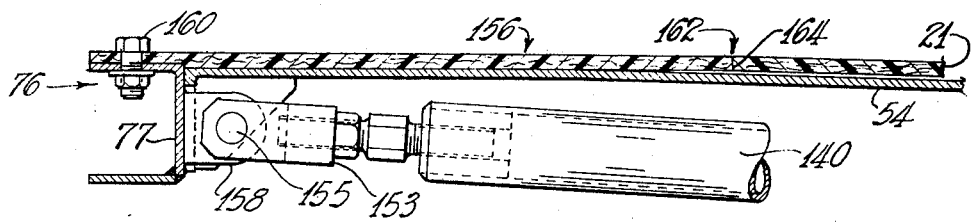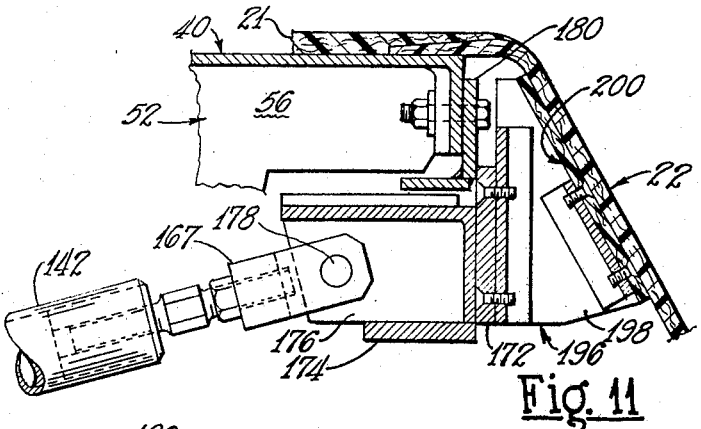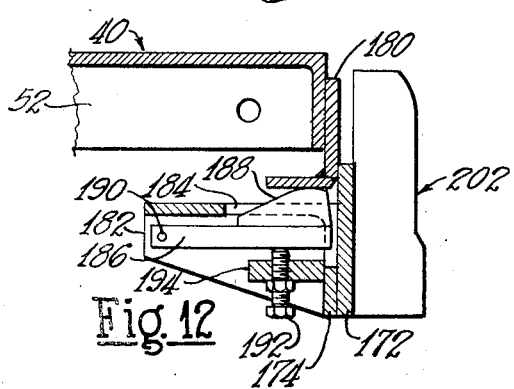
CECIL VAN ANDERSON &
WARD B MILLER
INVENTORS United States Patent Office 3,509,251
Patented Apr. 28, 1970

3,509,251
METHOD OF FORMING A TANK SECTION
Cecil Van Anderson, Toledo, and Ward B. Miller, Waterville, Ohio, assignors to Owens-Corning Fiberglas Corporation, a corporation of Delaware
Original application Feb. 16, 1967, Ser. No. 616,521, now Patent No. 3,454,983, dated July 15, 1969. Divided and this application Mar. 14, 1969, Ser. No. 807,234
Int. Cl. B29f 5/00
U.S. Cl. 264—259                                10 Claims

ABSTRACT OF THE DISCLOSURE

A section of a generally cylindrical hollow tank of a hardenable material, such as a glass fiber reinforced synthetic resin, is formed on the frusto-conical forming surface of a cantilevered mandrel. An end cap is provided over the small end of the mandrel, then the tank wall is formed on the mandrel and joined to the end cap. Once the tank section is cured to a self-supporting state, stripping forces are applied parallel to the axis of the mandrel against both the open end of the tank section and against the internal surface of the end cap, and continued to strip the tank section from the mandrel.

---

This is a division of our co-pending application, Ser. No. 616,521 filed Feb. 16, 1967, now Patent Number 3,454,983.

This invention relates to apparatus for producing tanks of reinforced synthetic resins, or reinforced plastics and, more particularly, to a forming mandrel having a built-in stripper jack mechanism for removing a formed tank half from the mandrel.

THE PROBLEM

It is desirable, in the production of reinforced plastic tanks, to form tank halves with a tapered mandrel and then butt join two (2) such halves to produce a complete tank. The taper of the mandrel permits part release by permitting a tank half to be slipped off the small end of the mandrel after it is fully cured. The system and process are versatile in that part formation is fast, and manufacturing equipment is more economical. Further, tank halves of differing size can be produced very readily by using different portions of the tank half mandrel.

By comparison, the earlier prior art has made reinforced plastic tank shells by filament winding a shell on a mandrel such as salt. The mandrel is dissolved and removed after the tank is completed. This is a very tedious operation. Therefore, by comparison, it will be understood that a tank half manufacturing process, followed by butt joining two halves, is a much more versatile and economical system for manufacturing tanks.

It is desirable, however, to have the taper of the mandrel and of the tank half as low as possible so that the finished tank is thereby more nearly cylindrical. Reduction of taper, however, is the factor which causes problems.

Thus, when a reinforced plastic shell cures, it has a tendency to shrink a very slight amount and this causes it to seize on or grip to the mandrel quite tightly. Since the cured synthetic resin is very strong, high forces are required for pushing the part off the mandrel. In an exemplary case in the production of a 6,000 gallon capacity underground storage tank, the tank half shell has a diameter of about 8 ft. and is about 10 ft. long. A force of approximately 50 tons is required to push the shell off the mandrel.

As will become evident later, this present force has been cut in half by the dual action of the invention herein described.

Further, the pushing must be absolutely uniform all around the tank half so that the tank half will not be cocked and thus bind on the mandrel and thus neither the part nor the mandrel will be damaged.

The stripper jack system of the present invention provides such improved and novel means.

It is the object of the present invention to provide a novel method of forming a reinforced plastic tank section on a mandrel including steps for stripping the formed tank section from the mandrel.

By the present invention a positive and uniform push is provided all around the periphery at the open end of the tank half, and is also equally distributed to and against the closed end of the tank half shell. By this invention, there is no part binding and, further, the mandrel can be used repeatedly over long periods without damage.

The manner in which these and other objects and advantages of the invention are developed will become apparent from the following description and appended claims, taken in conjunction with the accompanying drawings, wherein:

FIGURE 2 is a side-elevational view, partly in section, of a winding mandrel having the present invention incorporated therein;

FIGURE 3 is an elevational view taken as along the line 3—3 of FIGURE 2, but showing the drive support ring and associated mechanism only, thereby omitting the mandrel portion;

FIGURE 4 is a fragmentary view, partly in section, taken as along the line 4—4 of FIGURE 3;

FIGURE 5 is a sectional view, taken along the line 5—5 of FIGURE 3;

FIGURE 6 is a fragmentary view, partly in section, taken along the line 6—6 of FIGURE 3;

FIGURE 7 is a fragmentary, sectional view taken along the line 7—7 of FIGURE 3;

FIGURE 8 is a fragmentary view, partly in section, taken along the line 8—8 of FIGURE 3, showing the motor mounting:

FIGURE 9 is an enlarged fragmentary, elevational view taken as along line 9—9 of FIGURE 2, but omitting the mandrel and pull tube;

FIGURE 10 is an enlarged fragmentary, detail sectional view taken along the line 10—10 of FIGURE 2;

FIGURE 11 is an enlarged, fragmentary, detail view, partly in section, taken along the line 11—11 of FIGURE 2; and FIGURE 12 is a view similar to FIGURE 11, taken at another position.

ENVIRONMENT FOR THE INVENTION; FIGURE 1

Figure 1:
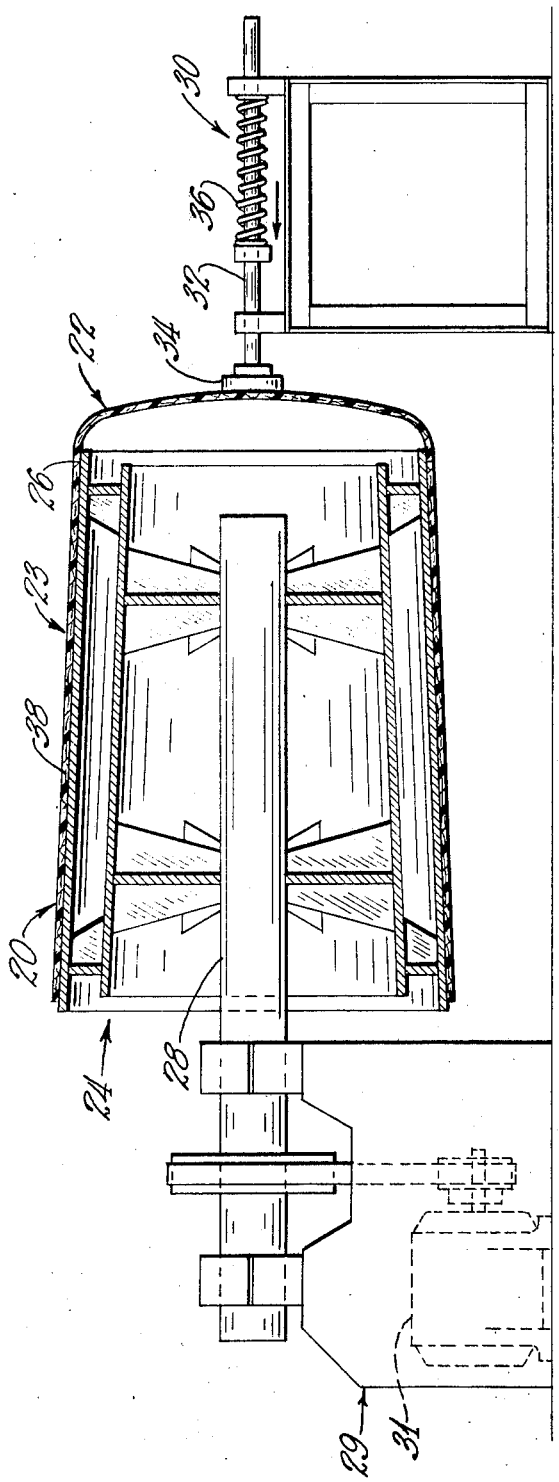
FIGURE 1 is a side-elevational view, partly in section, of a winding mandrel and dead-center mechanism, illustrating the environment for the present invention.

The basic unit made by the present invention is a tank half 20 which is a hollow reinforced plastic shell similar to a large cup, This comprises an end cap 22, which is made by a suitable spray lay-up technique at another location from the forming mandrel. This end cap 22 is cured to a handleable state and is then brought to a forming mandrel 24, illustrative of that of the present invention. Note the hypothetical joint 26 at the peripheral edge of the end cap 22, between the end cap and the frusto-conical wall element 23, which is subsequently formed on the outer surface of the mandrel 24.

The mandrel 24 is a large, hollow, open-ended frusto-conical shell. The slight taper provides part release. Thus, the completed tank half 20 can be slid off the small end. The mandrel 24 is supported in a suitable manner for rotation on a central support shaft 28. The shaft 28 is cantilevered from a large base 29 so that the small end of the mandrel 24 is exposed for application of the tank end cap 22. Within the large base member 29, there is a driving motor 31 and associated mechanism for turning the central support shaft 28.

The end cap 22 is held in position at the end of the mandrel 24 by means of a dead-center mechanism 30. The dead-center mechanism 30 is held in place by suitable means; and, includes a rotatable shaft 32. A rubber pad 34 is provided at the end of the shaft 32. A spring 36, or other suitable means, urges the shaft 32 in a direction to force the rubber pad 34 against the end cap 22 and firmly hold the end cap in position at the end of the mandrel 24.

As also shown in FIGURE 1, a layer of glass fiber reinforced plastic 38 has been applied to cover the outer surface of the mandrel 24 and is coupled with the end cap 22 during the curing process.

After the tank half 20 is fully cured, pressure is applied against the tank half to force it off the mandrel 24.

Heretofore, efforts to remove the tank half 20 have involved application of all push force against the closed end or end cap 22. When it is considered that 50 tons of force is required, the stresses imposed against the end cap 22 will become apparent. Application of all force at one localized area, therefore, is undesirable and imparts undue stress and strain against the tank half 20 as well as against the mandrel 24. By this arrangement, a ½° tapered tank half 12 ft. long and 90 in. in diameter, by existing jack techniques pushing against the closed tank end, requires a pressure of approximately 50 tons for stripping.

A novel feature of the present invention is that push force is equally distributed between the closed end and the open end of the tank half. By this arrangement, the resulting push force of the system can be greatly multiplied. Further, there is much less strain imposed against the mandrel, thereby providing long life and improved durability for the equipment.

THE INVENTION

As shown in FIGURE 2, the present invention comprises a large mandrel 40 including a hollow frusto-conical shell 42 that is mounted for rotation on a cantilevered shaft 43. The shaft 43 is supported by means, not shown, and forming no part of the present invention, within a cantilevered support housing 44. Viewing FIGURE 2, the left end of the support housing 44 is received within standards 46 extending to the floor 48. At the floor 48, there is a large base 50 for supporting the entire mechanism and the standards 46 are securely fastened to the base.

A drive motor and gear reduction mechanism, not shown, are attached to the shaft 43 for controlled rotation. These are not shown because they form no part of the invention.

The frusto-conical shell 42 extends back over the cantilevered support housing 44 and comprises a grid and skin assembly 52 that is made up of a frusto-conical outer skin 54, suitably of glass fiber reinforced resin or of other material such as metal. The longitudinal grid members 56 extend axially substantially the entire length along the inner surface of the skin 54. The grid members 56 are arranged in an annular pattern. Inside the grid members 56 there is a cylindrical inner wall 58 by means of which the entire frusto-conical shell 42 is fastened to and supported by the shaft 43. With the grid members 56 between the outer skin 54 and the inner wall 58, a very stiff and rigid shell is provided.

A mandrel adapter 60 is utilized to support the frusto-conical shell 42 at the back end, being positioned around the medial portion of the support housing 44. This is provided with suitable anti-friction guide means so that the shell 42 can rotate and yet be accurately supported by the housing 44. At the front end of the shaft 43, there is an inner wall 62, extending between the shaft flange 64 and the inner surface of the cylindrical inner wall 58. The mandrel 40 is thus supported for rotation in a cantilevered manner.

THE STRIPPER MECHANISM

The stripper mechanism 66 is mounted at the front end of the mandrel 40, FIGURE 2, inside of the frusto-conical shell 42, so that it can apply pressure between the frusto-conical shell and the formed tank half; and, thus, transmit the pressure between the mandrel 40 and the formed tank half 20 in order to remove or strip the tank half from the mandrel.

In general, the stripper mechanism 66 comprises a mechanical worm gear jack system which multiplies the force available to remove the tank half 20 without damage, from the mandrel 40, and also without damage to the mandrel. Thus, a plurality of worm gear jacks 68, in this case five were used, are equally spaced around the axis of the mandrel 40. The jacks 68 are all simultaneously driven by a common ring gear 70, also shown in FIGURE 3, so that all of the worm gear jacks push with absolutely the same force between the mandrel 40 and the tank half 20. From the worm gear jacks 68, a toggle linkage system 72, pivoting about a fixed point or shaft 74, applies a pull pressure to a pull ring 76 at the rear end of the mandrel 40; and, also applies a push pressure against a head or push-off ring assembly 78 at the forward or front end of the mandrel.

Thus, the present invention can be characterized as a pull-push stripper.

There is a very subtle action involved here—which gives rise to substantial novelty in the present invention and this action is twofold:

(1) The pressure applied effects a partial separation of the rear tank edge from the mandrel 40; and then, (2) Continued pressure against the end cap 22 of the tank half shell 20 effects complete separation of the tank half shell from the mandrel 40.

By this arrangement, a ½° tapered tank half 12 ft. long having a 90 in. diameter is removed in a uniformly improved manner by an estimated 25 tons of pressure or less by this invention. In addition, time for stripping is substantially reduced.

THE JACK DRIVE ASSEMBLY: MOVABLE JACK DRIVE SUPPORT RING; FIGURES 2, 3, 4 AND 6

This assembly includes a fabricated drive support ring 80 of annular configuration. An outer angle ring 82, FIGURE 6, and an inner angle ring 84, bridged by radial webs 86, make up this unit. As shown in the detail view of FIGURES 3 and 4, spaced support brackets 88 are mounted to the back side of the outer angle ring 82 and embrace a support plate 90 that is pivoted at 92. A guide roller 94 is carried at the free end of the support plate 90. In FIGURE 4, by means of an adjusting bolt 96 through a lug 98 on a support plate 90, and a lock bolt 100 in an arcuate slot 102, the position of the roller 94 is adjusted. It will be noted in FIGURE 2 that all of the rollers 94 engage the inside surface of the cylindrical inner wall 58 of the mandrel 40. By proper adjustment of the rollers 94, the drive support ring 80 moves coaxially inside of the mandrel 40.

The drive support ring 80 is guided for accurate, axially aligned movement and is held against rotation. As shown in FIGURE 2, axial slots 104 are provided in the outer end of the cylindrical inner wall 58. As shown in FIGURES 2, 3 and 5, stop bars 106 are secured to the outer angle ring 82 of the drive support ring 80, and move in the axial slots 104 of the cylindrical inner wall 58.

JACK MOUNTING PLATES; FIGURES 2 AND 6

Jack mounting plates, either 108 or 110 (motor) span between the outer angle ring 82 and the inner angle ring 84. These not only provide support for the jacks 68 and their drive assemblies, but also add substantial stiffness and rigidity to the jack drive support ring 80.

THE BULL GEAR

As best shown in FIGURE 3, a large bull ring gear 70 is mounted for rotation at the inner ends of the five jack mounting plates 108 and 110. Details of mounting are best shown in FIGURE 7. Thus, to each of the mounting plates 108 and 110 there is fastened a bull gear support bracket 112. Within the bracket 112, there is journaled a bull gear support roller 114. The inner periphery of the bull gear 70 is smooth and runs on the support rollers 114. Guide blocks 116 on each side cause the bull gear 70 to track properly.

The outer periphery of the bull gear 70 is provided with teeth 71, FIGURE 3.

The bull gear 70 is driven by a motor 118, upper center of FIGURE 3 and FIGURE 8. A motor mount stand 120 is fastened to the mounting plate 110 and a motor mounting plate 122 is fastened to the outer end of the motor mount stand to rigidly support the motor 118. The shaft 124 of the motor 118 carries a pinion gear 126, FIGURE 3, whose teeth mesh with the teeth 71 of the bull gear 70. The motor 118 is reversible. Thus, the bull gear 70 can be rotated in both directions to either extend the jack rams 69 of the worm gear jack 68, FIGURE 2, or to retract the jack rams.

THE DRIVE MECHANISM FOR THE JACKS

Each jack drive mechanism is comprised of a spiral miter gear box 128, FIGURES 2, 3 and 6, secured to a mounting plate 108 or 110. The input shaft 130 of each spiral miter gear box 128 carries a pinion gear 126. As shown in FIGURE 3, all of the pinion gears 126 engage the teeth 71 of the bull gear 70.

A worm gear jack 68 is also secured to each mounting plate 108 or 110. The output shaft 132 of the spiral miter gear box 128 is connected by means of a coupling 134 to the input shaft 136 of the worm gear jack 68.

THE TORQUE RING, FIGURES 2 AND 6

As best shown in FIGURE 2, a large torque ring 138 is engaged by and connected to the exposed end of each jack ram 69 of the worm gear jack 68. As will now be described, the torque ring 138 is operably connected to move the toggle links 73 that in turn operate the pull tubes 140, acting through the pull ring 76 at the back of the mandrel to impart a pull force against the back of a tank half on the outer surface of the mandrel. The push tubes 142 are operably connected to the drive support ring 80 and extend forwardly to impart a push against the head or push-off ring 78, for a push force against the closed end of the tank, as will be developed fully later.

THE TOGGLE LINKAGE SYSTEM

The toggles 73 are best shown in FIGURES 2 and 9. These comprise lever arms 144 and 146, FIGURE 9, welded together into a rigid unit, and the so-fabricated arm is pivoted at 74, FIGURE 2, to the longitudinal grid members 56. The lower arms 146 are spaced to embrace a connecting lug 148, fastened to the torque ring 138. A connecting pin 150 completes the pivot assembly.

The outer end of each toggle link 73 is embraced by a connector 152 at the inner end of a pull tube 140, and a pivot connection is provided at 154.

THE PULL TUBES 140 AND PULL RING ASSEMBLY 76; FIGURES 2 AND 10

The pull that is applied at the rear of the mandrel 40 against the open end of the tank half 20 is effected through the pull of the pull tubes 140 against the pull ring 76. The pull tubes 140 are lengths of pipe or steel tubing with appropriate pivot connections 154, 155 at each end. The connection 154 at the front ends is well illustrated in FIGURE 2.

By reference to FIGURE 10, the connection 155 between the pull tubes 140 and the pull ring 76 at the rear ends will be described.

THE PULL RING OF FIGURE 10

The pull ring 76 is a large fabricated ring that operates at the rear end of the mandrel 40 to actuate a pull sleeve 156, FIGURE 10, or 157, FIGURE 2, along the outer surface of the mandrel 40. The pull sleeve 157 in FIGURE 2 is a unit fabricated of steel ring and plate. The pull sleeve 156 shown in FIGURE 10 is fabricated of reinforced synthetic resin, or plastic.

The pull ring 76 is made of angle stock and on the inside of the vertical flange 77 is a lug 158 that is embraced by the spaced arms of the pivot connector 153, fastened to the back end of a pull tube 140.

The reinforced resin sleeve pusher 156, shown in FIGURE 10, is laid up on the outer surface of the mandrel 40 with the pull ring 76 centered to the mandrel. The reinforced resin sleeve 156 is then fabricated on the mandrel 40 with pattern wax for clearance and using a suitable release agent as required. The pull sleeve 156 is then drilled and the anchor bolts 160 applied. The sleeve 156 is then scored at the front 162 and removed and cut to a square edge 164. This square edge 164 provides a form against which the tank wall 21 can be laid and also provides a ram surface.

It will be evident that as the pull ring 76 is moved back and forth relative to the back edge of the mandrel 40 by the pull tubes 140, it will be effective to move the pull sleeve 156 or 157 along the outer surface of the mandrel. When moved to the right, viewing FIGURE 2, the pull sleeve will thereby be effective to impart a force against the tank half 20 to strip it from the mandrel 40.

As shown in FIGURE 2, as the jack rams 69 push against the torque ring 138, the toggle links 73 are biased in a manner to apply tensile force to the pull tubes 140 to effect this result.

Viewing FIGURES 2 and 10, it is to be understood that modifications can be provided at this point. These are encompassed within the scope of the invention. Thus, viewing FIGURE 2, an auxiliary sleeve can be slipped on from the front end of the mandrel to abut the pull sleeve 156 or 157. By making these auxiliary sleeves of appropriate axial lengths, tank halves of different sizes can be made. Thus, 5,000, 6,000 gallon tanks or other sizes can be made, depending upon the size of the auxiliary sleeve placed upon the mandrel in front of the pull sleeve 156 and 157.

THE PUSH TUBES 142 AND HEAD RING ASSEMBLY 78

In FIGURES 2 and 11 it will be noted that a push tube 142 is provided for each worm gear jack 68. Rear end push tube pivot connectors 166 are shown in FIGURES 2 and 6. Thus, the drive support ring 80 includes a clevis block 168 carrying a clevis pin 170. The connector 166 at the rear end of the push tube 142 embraces the clevis block 168 and the pin 170 completes the pivot connection.

Details of the head ring 78 are best shown in FIGURE 11. The head ring 78 is a large flat annular ring 172 of steel, bolted to an annular head ring mount 174. This assembly operates at the forward end of the mandrel 40 to push directly against the end cap 22 of the tank half 20 as shown in FIGURE 2.

A plurality of front end push tube connectors 167 are provided, one for each push tube. Clevis blocks 176, FIGURE 11, are welded to the inside of the head ring mount 174. The spaced arms of the pivot connector 167 at the forward end of the push tube 142 embrace the clevis block 176, and the clevis pin 178 completes the pivot connection.

CENTERING MECHANISM FOR THE HEAD RING 172; FIGURE 12

The head or push ring 172 is slidable relative to the grid and skin assembly 52 of the mandrel 40, which is fitted at its outer end with a head ring assembly support ring 180. Bracket webs 182 are welded inside the head ring mount 174 and a slot 184 is provided. A centering lever 186 with an adjustment pad 188 at the outer end is pivoted on a pin 190, to the bracket web 182. A bolt 192, passed through a lug 194 on the web 182, is used to adjust the pad 188. A plurality of these pads 188 are provided around the head ring mount 174 and thus the head ring 174 can be accurately centered to the grid and skin assembly 52.

THE HEAD RING FORM

A previously formed end cap 22, FIGURE 11, is applied to the end of the mandrel 40 in the manufacture of a tank half 20 as in FIGURE 1. Therefore, a suitable form must be carried by the head ring 172 in order to conform to the inner surface of the end cap 22. Thus, pressure will be uniformly distributed to the end cap 22.

In FIGURE 11, a head ring form dished 196 is utilized. This will accommodate a convex end cap 22 as indicated. A plurality of brackets 198 support an annular support pad 200 that conforms to the inner surface of the end cap 22. The brackets 198 are fastened to the front side of the head ring 172.

As shown in FIGURE 12, a head ring form flat 202 for a flat end cap is indicated. Thus, the invention accommodates both convex and flat end caps.

OPERATION OF THE INVENTION, FIGURE 2; RETRACTION FOR LAY-UP, PART FORMATION

In the lower left hand portion of FIGURE 2, the tank half 20 has been formed on the mandrel 40 with the jack rams 69 fully retracted to the right, pulling the torque ring 138 with them so that the toggle links 73 move the pull tubes 140 to the left. Thus, the pull ring assembly 76 is thereby moved away from the back edge of the outer surface of the mandrel 40. This brings the front edge of the pull sleeve 157, FIGURE 2, or 156, FIGURE 10, to the proper position on the outer surface of the mandrel 40 for laying up the tank half 20. Thus, the mechanism is retracted, making it possible for a subsequent stripping pull to be applied by the pull ring assembly 76.

In the lower right hand portion of FIGURE 2, retraction of the jack rams 69 has also pulled the drive support ring 80 back away from the front end of the mandrel 40. This is effective to pull the push tubes 142 back and, thus, the head ring 78 is moved back to tank half forming position at the front edge of the mandrel 40.

THE STRIPPING OPERATION

Referring to the upper part of FIGURE 2, the motor 118, FIGURE 3, is rotated in a direction to provide a stripping motion to the jack rams 69, that is, to extend the jack rams toward the rear end of the mandrel 40. Thus, the motor rotates the bull gear 70 through the pinion gears 126 which, in turn, drives the other pinion gears 126 sending power into the spiral miter gear boxes 128. The output from the spiral miter gear boxes 128 flows into the worm gear jacks 68. The power causes the jack rams 69 of the worm jacks 68 to extend. The action is as follows:

(1) The worm gear jack rams 69 push the torque ring 138 in a left-hand direction, viewing FIGURE 2. This imparts clockwise rotation to the toggle links 73 and imposes resistance into the mandrel 440 at the toggle linkage pivot point 74, pulling the pull tubes 140 toward the right. This pulls the pull ring assembly 76 and the pull sleeve 156 or 157 in a right-hand stripping direction. As soon as the load is fully applied by the invention and assumed by the tank half, resistance sets in; this causes the following action to take place;

(2) The jack rams 69 exert resistance against the bodies of the jacks 68, in turn transmitting this force into the drive support ring 80. The drive support ring 80 in turn pushes against the push tubes 142. This push is transmitted into the head ring assembly 78 and thus pressure is applied against the tank end cap 22. The resultant balance of forces when the jack 68 applies a 1 lb. force, is as follows:

(a) A 1 lb. force is applied at the back end of the mandrel 40 through the pull ring assembly 76;

(b) A 1 lb. force is applied at the front end of the mandrel 40, through the head ring assembly 78; and, (c) Therefore, a 2 lb. force is generated at the pivot pin 74 of the toggle link 73. Thus, the stripping force between the mandrel 40 and the tank half 20 is 2 lbs.

The drive support ring 80 travels along the slots 104 in the outer end of the cylindrical inner wall 58, as necessary, to impose the force against the rear and front of the tank half 20.

Note that the rear edge of the tank half 20 is thereby first broken away slightly or loosened, and then forces are balanced between the rear and front of the mandrel for the remainder of the stripping operation.

It will be evident that the jacking pressure is cut in half as compared to the prior efforts where all of the push was imparted against the tank end with resultant double push force requirement. In addition, the time for stripping is reduced.

This is illustrated by the following example:

If a stop were placed in the slot 104 to prevent travel of the drive support ring 80, the 1 lb. force at that point would be transferred to the pivot pin 74. The force, therefore, at the back end of the tank half would remain at 1 lb. Thus, the stripping force between the mandrel and the tank would have to be doubled to equal that of the present invention and the stripping time would be doubled, while in the present invention stripping time is decreased.

We claim:

1. In a method of forming a cup-like part on the tapered endless forming surface of a forming mandrel, the steps of:
    providing on the mandrel at the large end a pull ring assembly including a sleeve slidable over said endless forming surface,
    providing on the mandrel at the small end a push ring assembly including formed push means to bear against the closed end of the part formed on the mandrel,
    placing a preformed end cap of hardenable material over the small end of the mandrel and in at least partially overlapping relationship to said endless forming surface,
    then forming an endless wall of hardenable material over said endless forming surface and joining it to said end cap to make the cup-like part,
    directing tensile force into said pull ring assembly and said sleeve and against the open end of said cup-like part,
    directing compression force into said push ring assembly and into said formed push means and against the closed end of the part,
    and continuing said tensile and compression forces to strip said part from said mandrel.

2. The invention according to claim 1 including the additional step of placing an auxiliary sleeve over said endless forming surface and against said slidable sleeve.

3. A method of forming a generally cylindrical hollow tank section on the endless forming surface of a mandrel rotatably supported in space, comprising the steps of:
    providing an end cap of hardenable material over the end of the mandrel and in at least partial overlapping relationship to the said forming surface,
    forming an endless wall of hardenable material over said endless forming surface and joining it to said end cap to make the tank section,
    then applying a first stripping force against the open end of the tank section,
    applying a second stripping force against the said end cap of the tank section, and
    continuing said first and second stripping forces to strip the tank section from said mandrel.

4. A method as described in claim 3, wherein the said first and second stripping forces are applied parallel to the axis of said mandrel.

5. A method as described in claim 3, wherein the said second stripping force is applied against the inner surface of said end cap of the tank section.

6. A method of forming a hollow tank section on the endless forming surface of a frusto-conical forming mandrel rotatably supported in space, comprising the steps of:
provide an end cap of hardenable material over the small end of the mandrel and in at least partial overlapping relationship to the said endless forming surface,
forming an endless wall of hardenable material over said endless forming surface and joining it to said end cap to make the tank section,
then applying a first stripping force against the open end of the tank section,
applying simultaneously with said first stripping force a second stripping force against the inner surface of said end cap of the tank section, and
continuing said first and second stripping forces to strip the tank section from said mandrel.

7. A method as described in claim 6 wherein the said first and second stripping forces are applied parallel to the axis of said mandrel.

8. A method as described in claim 6 wherein the said first stripping force is uniformly distributed around the periphery of the open end of said tank section.

9. A method as described in claim 6 wherein the said second stripping force is uniformly distributed around an annular portion of the inner surface of said end cap of said tank section, and wherein the said annular portion of the inner surface of said end cap is concentric about the axis of said mandrel.

10. A method of forming a hollow plastic tank section on the continuous forming surface of a tapered mandrel rotatably supported in space, comprising the steps of:
providing a partially cured plastic end cap over the small end of said mandrel and in at least partial overlapping relationship to said continuous forming surface of said mandrel,
forming a continuous wall of a tank section by spraying glass fibers and uncured resin on the continuous forming surface of said mandrel,
curing said resin sufficiently to integrate said continuous wall with said end cap to make the tank section and to make said tank section structurally self-supporting,
then applying a first stripping force against the open end of said tank section, and
simultaneously applying a second stripping force against the inner surface of said end cap of said tank section,
continuing said first and second stripping forces to strip the tank section from said mandrel.

References Cited
UNITED STATES PATENTS

| | | | |
|---|---|---|---|
| 2,360,899 | 10/1944 | Scharenberg | 18—45 |
| 3,412,891 | 11/1968 | Bostone | 264—109 X |

ROBERT F. WHITE, Primary Examiner

R. H. SHEAR, Assistant Examiner